United States Patent [19]
Choisel

[11] 4,273,072
[45] Jun. 16, 1981

[54] PREFABRICATED WALL STRUCTURE FOR FORMING AN ENCLOSURE SUCH AS A HORSE-BOX

[76] Inventor: Daniel P. L. Choisel, 2 Muette St., The Lower Bushes, 28100 Dreux, France

[21] Appl. No.: 81,145

[22] Filed: Oct. 2, 1979

[30] Foreign Application Priority Data

Oct. 5, 1978 [FR] France .................. 78 28470

[51] Int. Cl.³ .............................................. A01K 1/00
[52] U.S. Cl. ...................................... 119/27; 403/245
[58] Field of Search .......................... 119/16, 27, 20; 403/245, 246; 52/297, 632; 256/73, 26

[56] References Cited

U.S. PATENT DOCUMENTS

| | | | |
|---|---|---|---|
| 2,281,220 | 4/1942 | Anderson | 287/54 |
| 3,699,924 | 10/1972 | Hero | 119/16 |
| 3,802,393 | 4/1974 | Naylor | 119/27 |
| 4,146,211 | 3/1979 | Choisel | 256/26 |

FOREIGN PATENT DOCUMENTS 2111383 9/1972 Fed. Rep. of Germany.

Primary Examiner—Hugh R. Chamblee
Attorney, Agent, or Firm—Gerald J. Ferguson, Jr.; Joseph J. Baker

[57] ABSTRACT

A prefabricated wall structure for forming an enclosure such as a horse-box has two spaced tubular uprights defining an opening therebetween which can be blocked by a door. A crosspiece extends from one post, across the opening, beyond the other post and is secured to a wall section supported by the other post. The crosspiece gives rigidity to the structure. Each post has a substantially square cross-section and has fixing holes provided in the end portions thereof. The crosspiece carries mounting means which are inserted in the upper end portions of the posts and engaged by screws extending through the fixing holes. A door for closing the opening can be supported either by one of the posts or by the crosspiece.

5 Claims, 6 Drawing Figures

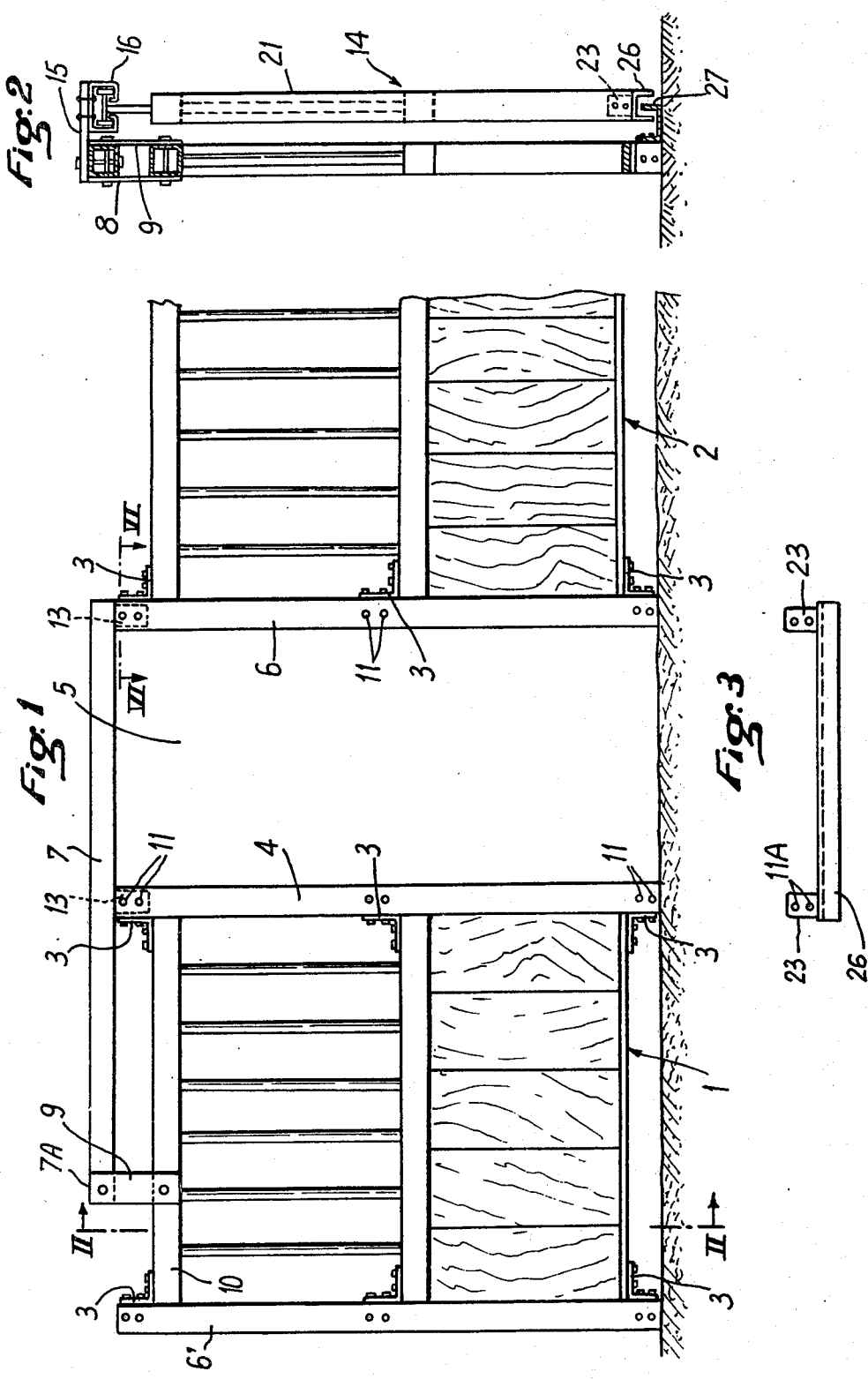

PREFABRICATED WALL STRUCTURE FOR FORMING AN ENCLOSURE SUCH AS A HORSE-BOX

BACKGROUND OF THE INVENTION

The present invention relates to a wall structure, having an opening and a door, which forms part of a light construction such as a prefabricated horse-box. The structure is not limited to the formation of horse-boxes; the wall structure can be used to form any type of enclosure or construction.

Prefabricated walls for a horse stall or horse-box are already known. For example, French Pat. No. 72/17,871 describes prefabricated partitions which are arranged in pairs, one being referred to as a longitudinal partition and the other being referred to as a transverse partition. In the longitudinal partition, an opening is provided which is laterally bounded by two spaced posts; in addition, an upper frame member, which terminates the partition at its top, extends between the posts where it acts as a linking crosspiece. This arrangement is conventional. It exhibits the disadvantage that the posts bounding the opening are incorporated in the panel and that, consequently, the plane of the opening and the plane of the panel are always identical.

It is also known that it is possible to dissociate the panel from the posts joined at their top by a crosspiece, that is to say to produce these two units separately and subsequently to fix the panels to the posts using, for example, right-angle brackets. In this way, the plane of the opening and that of the panels can be in different vertical planes at an angle with one another, as is described in French Pat. No. 77/15,720. The structure described in this last mentioned French Patent is given adequate rigidity by firmly anchoring the post in the ground. However, the production of large anchoring means is sometimes difficult and expensive.

It is an object of the present invention to provide a wall structure, with an opening and a door, in which the panels and the posts bounding the opening are not incorporated together at manufacture, and in which adequate rigidity of the installed wall can be achieved by anchoring the posts lightly in the ground.

A further object of the invention is to provide a wall structure which permits either a sliding door or a swing door to be mounted on site, without prior conversion of the posts and the panels prefabricated in the factory.

It is also an object of the invention to provide a wall structure with an opening which can be blocked with either type of door, namely a sliding door or swing door, which structure, in the case of a swing door, makes it possible, without difficulty and without prior conversion of the posts and the panels prefabricated in the factory, to mount the swing door on site on either side, namely on the right or left, either direction of opening, namely outwards or inwards, being chosen.

SUMMARY OF THE INVENTION

According to the present invention there is provided a wall structure comprising first and second upright posts, said posts being spaced to define an opening therebetween which can be blocked by a door, a wall section mounted on the second post, and a crosspiece extending from the first post across said opening and beyond the second post by a distance at least equal to the width of the opening, said crosspiece being connected to upper end portions of said first and second posts and to an upper portion of said wall section.

Preferably, the first and second posts are each hollow and have a square cross-section and the crosspiece carries mounting elements which can be introduced into the hollow, upper end portions of the posts and can be fixed thereto.

With a wall structure of this kind, the extended crosspiece may support a rail to extend parallel to the crosspiece for supporting and guiding a sliding door.

According to the invention, the two end portions of each said post advantageously have holes provided in their four faces.

A door may be provided comprising tubular uprights having a square cross-section, which are identical to said first and second posts, the two opposite end portions of these uprights possessing holes in their four faces.

A sliding door is provided on its lower edge, with a channel member of which the opening is directed towards the ground, in the use position, this channel member being held in place at its ends by means of square elements which are introduced into the lower ends of the hollow tubular uprights of this door and are fixed thereto, the faces of these square elements having holes which can be aligned with the holes in the uprights.

With a swing door hinges are provided, each hinge comprising a square element having faces provided with holes, which element can be introduced into the end portions of the hollow tubular uprights of the door and can be fixed thereto, and a plate having a hole for receiving a pivot pin, which plate is firmly fixed to the square element at an angle of 45° thereto.

According to an embodiment, the elements of the crosspiece which can be introduced into the posts and can be fixed thereto consist of small plates which cross one another and are arranged in the posts to extend in the direction of the diagonals of the cross-section of these posts.

BRIEF DESCRIPTION OF THE DRAWINGS

An embodiment of the present invention will hereinafter be described, by way of example, with reference to the accompanying drawings, in which:

FIG. 1 shows an elevation of a wall structure according to the invention,

FIG. 2 is a section taken along line II—II of FIG. 1,

FIG. 3 is a detail view showing a channel bar for guiding the lower part of the sliding door of FIG. 2.

DESCRIPTION OF A PREFERRED EMBODIMENT

Figure 4:
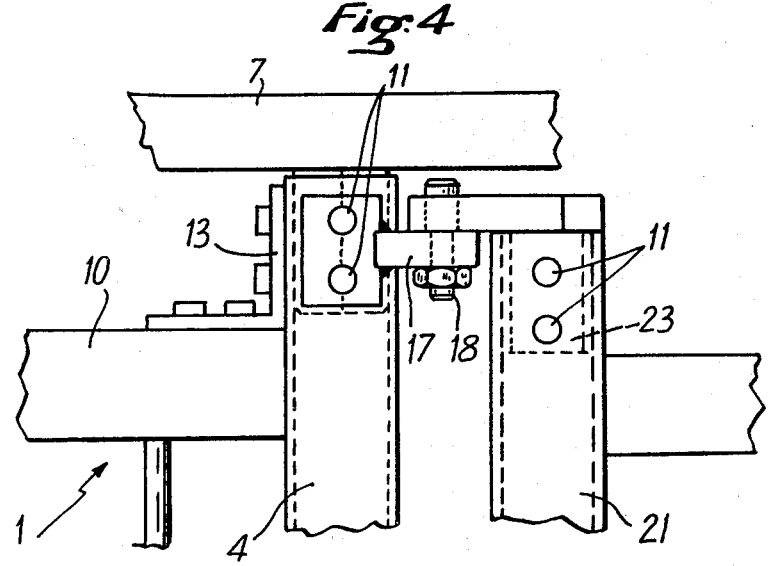
FIG. 4 is an enlarged detail 1 view showing the fixing of hinge pins of a swing door to the wall structure of the invention.

FIG. 1 shows a wall for a horse-box or other enclosure having a first wall section 1 and a second wall section 2. This second wall section 2 can be used to extend the first section 1 such that the two sections together bound a single enclosure. Alternatively, and as in the embodiment illustrated, the first section 1 can bound a first enclosure and the second section 2 can bound a second enclosure which is a continuation of a first enclosure.

The wall sections 1 and 2 are identical, are prefabricated in the factory and are fixed on site by means of posts to which they are joined by suitable means, for example by right-angle brackets 3.

In order to enter the box or the enclosure, an opening 5 is provided which can be blocked by a door. A first post 4 serves as a frame for the opening 5 and one end of the first wall section 1 is fixed to the post 4. A second post 6 is spaced from the first post 4 by the distance chosen for the width of the opening 5. This second post 6 also serves as a frame for the opening 5 and is additionally used for fixing one end of the second wall section 2. The two ends of the wall sections 1 and 2 remote from the opening 5 are fixed by means of right-angle brackets 3 to other posts, only one of which, designated by the reference 6', can be seen on the left-hand side of FIG. 1. The arrangement shown in FIG. 1 can be repeated many times. FIG. 1 indicates one face of a series of boxes; on this face, each individual box then has a wall defined by the wall section 1, the opening 5, bounded by the posts 4 and 6, and the door (not shown in FIG. 1) which serves to close the opening 5.

If it is required to be able to anchor the posts 4 and 6 in the ground as light as possible, which is advantageous, it is necessary to impart a high rigidity to each wall, defined above, of an individual box. The necessary rigidity can be imparted to a wall defined by a first wall section 1 and posts 4 and 6 by mounting an upper crosspiece 7 to extend between the top of the first post 4 and the top of the second post 6, the upper crosspiece 7 also extending beyond the post 4 by a distance which is at least equal to, or slightly greater than, the distance separating the two posts 4 and 6. Where the wall of an individual box is defined by posts 4 and 6 and the second wall section 2, the crosspiece 7 is mounted to extend beyond the post 6.

The free end 7A of the extended crosspiece 7 is firmly joined to the upper zone of the wall section 1 associated with the post 4 beyond which the crosspiece extends. Two parallel plates 8 and 9 are securely bolted both to the end 7A of the crosspiece 7 and to an element, for example an upper beam 10, of the wall section 1. Thus, the end 7A and the beam 10 are firmly connected to one another.

It will be appreciated that even though the posts 4 and 6, the wall sections 1 and 2 and the crosspiece 7 can be prefabricated separately in the factory, after mounting on site, a wall structure which has an adequate inherent rigidity for the posts 4 and 6 to be only lightly sealed or anchored in the ground is obtained. It is not necessary to deeply anchor the posts in the ground as is required with a structure such as that shown in FIG. 3 of French Pat. No. 77/15,720.

Figure 6:
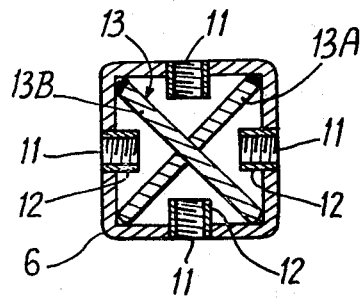
FIG. 6 is a section taken along VI—VI of FIG. 1.

According to the invention, the posts 4 and 6 which serve as a frame for the opening 5 are hollow, have a square cross-section, and the two opposite end sections of each post have holes 11 provided in each of their four faces. There are at least two of these holes 11, aligned in the centre of each face. In the illustrated embodiment identical aligned holes 11 are also provided in the central zone of each post 4 and 6. The holes 11 permit the easy and rapid fixing of the right-angle brackets 3. As the walls of each post are thin, sleeved nuts 12, which are known and commerically available, are fixed in the holes 11 as shown in FIG. 6.

The crosspiece 7 is provided with elements 13 which are designed to be introduced into the posts 4 and 6 and fixed with the use of the holes 11. In order not to hinder the fixing of the right-angle brackets 3, it is envisaged, according to the invention, for each element 13 to consist of two small plates 13A and 13B (FIG. 6) which cross one another and are arranged, when the element 13 is introduced into a respective post 4 or 6, in the direction of the diagonals of the cross-section of the respective post. Thus, the holes 11 and their sleeved nuts 12 on one face of the post can be used for receiving screws arranged to engage and block the element 13, whilst the holes 11 on the other faces of the post remain free and can receive screws for mounting right-angle brackets 3, or for mounting other pieces as will be seen below.

The wall structure of the invention has the further advantage that it can be equipped, without difficulty, with a sliding door or a swing door.

A sliding door 14 suspended by way of rollers from a rail 16 in a known manner is shown in FIG. 2. The rail 16 is supported by the extended crosspiece 7 to which it is fixed by means of transverse sections 15. The rail 16 is mounted on the crosspiece 7 at several spaced points and extends parallel to the crosspiece 7. The length of the crosspiece 7 is chosen such that the rail 16 can be supported over the entire length of travel of the sliding door 14.

Figure 5:
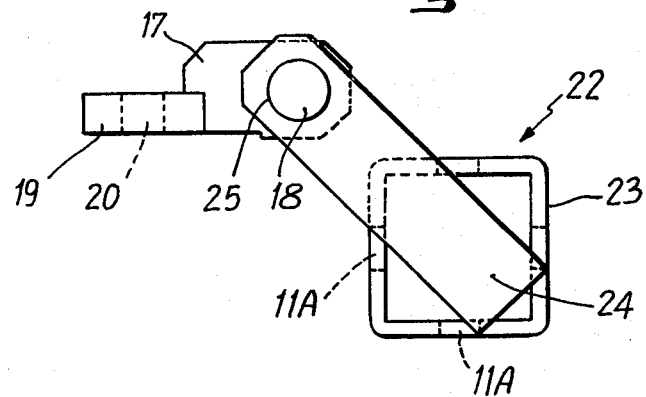
FIG. 5 is a top view of a piece for mounting a swing door pivotingly on the wall structure of the invention.

The mounting of a swing door is illustrated in FIG. 5. The swing door is mounted by way of top and bottom hinges which each comprise a plate 17 having a hole which is intended to receive a pivot pin 18. The plate 17 has a lug 19 provided with holes 20 which correspond to the holes 11 in the post 4 or 6. Thus, a right-angle bracket 3, the crosspiece 7 and the lug 19 can be mounted and securely fixed to the top of one and the same post 4, without any preparation being necessary on site (FIG. 4).

According to the invention, the swing or pivoting doors comprise uprights 21 (FIG. 2 and FIG. 4) which are hollow, have a square cross-section, and which are identical to the posts 4 and 6, each end section of an upright 21 being provided with holes 11 in each of its four faces. In the case of a swing door, each pivot pin 18 cooperates with a part 22 which is mounted on the door (FIGS. 4 and 5). Each part 22 is composed of a hollow element 23 of square cross-section, having faces provided with holes 11A. Each element 23 is introduced into one end of a respective upright 21 and fixed thereto by means of the holes 11 in the latter. Of course, the holes 11 and 11A are in alignment after the elements 23 have been positioned in the upright 21. Each square element 23 is provided, on its free end with a plate 24 which is securely fixed to the element at 45° thereto. This plate 24 possesses a hole 25 which is intended to receive the pivot pin 18.

It will be noted that a swing door can be mounted on site on either side of the posts 4 and 6 and of the wall parts 1 and 2, and this door can be caused to pivot towards the left or towards the right. Moreover, when a door has already been hung, it can easily be taken down and hung the other way round, without machining or drilling work being necessary on site.

With a sliding door 14 (FIG. 2), it is necessary to provide for the guiding of its lower end in addition to the suspension of the door from the rail 16. This is easily achieved, according to the invention, by means of U-shaped channel member 26, the opening of which is directed towards the ground in the use position of the door, and which is mounted on the lower end surface of the door 14. The channel member 26 is mounted on the door 14, by means of two square elements 23, having faces provided with holes 11A, which are introduced into the lower end of the uprights 21 of the door 14 and are fixed thereto, in the same manner as described above with reference to FIG. 5. Of course, the elements 23 are fixed to the face of the channel member 26 opposite the flanges and are spaced apart by a distance correspondng to the distance between the uprights 21 as is shown in FIG. 3. An L-shaped member 27 is fixed by one end to the lower part of the post 4, and is inserted between the flanges of the channel member 26 to ensure the guiding of the sliding door 14.

The exammple described above clearly shows that the invention makes it possible to prefabricate parts, such as the wall sections 1 and 2, the posts 4 and 6, the elongate crosspiece 7 and the swing or sliding doors, in the factory. On site, by lightly anchoring the posts 4 and 6 in the ground, a wide variety of assemblies can be erected without machining or drilling work. In particular, each post located at the end of a box or of an enclosure, such as the post 6 in FIG. 1, can also be used for fixing, by means of right-angle brackets 3, a transversely arranged separating panel extending from the rear face of this post, without thereby hindering the mounting of the wall section 2, the crosspiece 7 and a swing door, the hinge pins of which are located in front of the front face of the post 6.

I claim:

1. A wall structure for an enclosure comprising first and second upright tubular posts, the first and second posts being spaced to define an opening therebetween which can be blocked by a door, a wall section mounted on the second post, and a crosspiece extending from the first post across said opening and beyond the second post by a distance at least equal to the width of the opening, wherein each said post has four faces defining a substantially square cross-section, and each post has two end portions in which holes are provided in each of the four faces, a sleeved nut being mounted in each of said holes, and wherein first and second elements are mounted on the crosspiece and are received in the upper end portions of the first and second posts respectively, each of said elements comprising two plates which cross over one another and are arranged within the respective post such that each said plate extends along a diagonal of the cross-section of the post, screws being screwed into selected ones of said sleeved nuts to engage each said element, and wherein one end of said crosspiece is firmly connected to said wall section.

2. A wall structure according to claim 1, further comprising a door supported to block said opening, said door comprising at least one tubular upright supporting a door panel, said upright having four faces defining a substantially square cross-section and having two end portions in which holes are provided in each of the four faces, a sleeved nut being mounted in each of said holes, each said end portion being intended to receive an element comprising two plates crossing over one another.

3. A wall structure according to claim 2, wherein the door is hingedly mounted onto one of said first and second posts by means of two spaced hinges, each said hinge comprising an element having four faces defining a substantially square cross-section, each face of said element being provided with holes, each element being inserted into a respective end portion of said upright of the door and being fixed thereto by way of screws extending between aligned holes in the upright and the element, and each said hinge further comprising a plate fixed to the square element and the plate having a hole therein which a pivot pin is received.

4. A wall structure for an enclosure comprising first and second upright tubular posts, the first and second posts being spaced to define an opening therebetween which can be blocked by a door, a wall section mounted on the second post, and a crosspiece extending from the first post across said opening and beyond the second post by a distance at least equal to the width of the opening, wherein each said post has four faces defining a substantially square cross-section, and each post has two end portions in which holes are provided in each of the four faces, a sleeved nut being mounted in each of said holes, and wherein first and second elements are mounted on the crosspiece and are received in the upper end portions of the first and second posts respectively, each of said elements comprising two plates which cross over one another and are arranged within the respective post such that each said plate extends along a diagonal of the cross-section of the post, screws being screwed into selected ones of said sleeved nuts to engage each said element, and wherein one end of said crosspiece is firmly connected to said wall section wherein the door is hingedly mounted onto one of said first and second posts by means of two spaced hinges, each said hinge comprising an element having four faces defining a substantially square cross-section, each face of said element being provided with holes, each element being inserted into a respective end portion of said upright of the door and being fixed thereto by way of screws extending between aligned holes in the upright and the element, and each said hinge further comprising a plate fixed to the square element to extend at an angle thereto, the plate having a hole therein in which a pivot pin is received.

5. A wall structure for an enclosure comprising first and second upright tubular posts, the first and second posts being spaced to define an opening therebetween which can be blocked by a door, a wall section mounted on the second post, and a crosspiece extending from the first post across said opening and beyond the second post by a distance at least equal to the width of the opening, wherein each said post has four faces defining a substantially square cross-section, and each post has two end portion in which holes are provided in each of the four faces, a sleeved nut being mounted in each of said holes, and wherein first and second elements are mounted on the crosspiece and are received in the upper end portions of the first and second posts respectively, each of said elements comprising two plates which cross over one another and are arranged within the respective post such that each said plate extends along a diagonal of the cross-section of the post, screws being screwed into selected ones of said sleeved nuts to engage each said element, and wherein one end of said crosspiece is firmly connected to said wall section wherein the door is mounted for sliding movement relative to said opening, and further comprising a rail supported by the crosspiece and extending substantially parallel to the crosspiece, the upper end of the door carrying rollers arranged to slide along said rail, and wherein a U-shaped channel member is fixed to the lower end of the door, the channel member carrying square elements, each square element having four faces defining a substantially square cross-section, each face of said element being provided with holes, and wherein each said element is inserted into the lower end portion of a respective upright of the door and is fixed thereto by way of screws extending between aligned holes in the upright and the element.

* * * * *